United States Patent
Natsui et al.

(10) Patent No.: US 9,280,997 B2
(45) Date of Patent: Mar. 8, 2016

(54) TAPE RECORDING MEDIUM HAVING BOTH OPTICAL AND MAGNETIC RECORDING LAYERS

(71) Applicant: Panasonic Intellectual Property Management Co., Ltd., Osaka (JP)

(72) Inventors: Akinaga Natsui, Osaka (JP); Takeshi Morita, Okayama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/639,036

(22) Filed: Mar. 4, 2015

(65) Prior Publication Data
US 2015/0255104 A1   Sep. 10, 2015

(30) Foreign Application Priority Data

Mar. 5, 2014 (JP) ................. 2014-042325
Nov. 28, 2014 (JP) ................. 2014-241614

(51) Int. Cl.
| | |
|---|---|
| G11B 11/00 | (2006.01) |
| G11B 5/78 | (2006.01) |
| G11B 5/64 | (2006.01) |
| G11B 5/738 | (2006.01) |
| G11B 11/105 | (2006.01) |
| G11B 11/14 | (2006.01) |
| G11B 5/584 | (2006.01) |

(52) U.S. Cl.
CPC .. *G11B 5/78* (2013.01); *G11B 5/64* (2013.01); *G11B 5/738* (2013.01); *G11B 11/105* (2013.01); *G11B 11/14* (2013.01); *G11B 5/584* (2013.01)

(58) Field of Classification Search
None
See application file for complete search history.

(56) References Cited

U.S. PATENT DOCUMENTS

2010/0328802 A1* 12/2010 Fasen ............................. 360/31
2014/0036383 A1* 2/2014 Cideciyan et al. ............ 360/55

FOREIGN PATENT DOCUMENTS

| JP | 2006-053980 A | | 2/2006 |
|---|---|---|---|
| JP | 2006-165845 A | | 6/2006 |
| JP | 2008310956 A | * | 12/2008 |
| JP | 2009004088 A | * | 1/2009 |

* cited by examiner

*Primary Examiner* — Tan X Dinh
(74) *Attorney, Agent, or Firm* — McDermott Will & Emery LLP

(57) ABSTRACT

Provided is a tape recording medium including: a base layer having a first surface and a second surface; a first recording layer disposed over the first surface of the base layer and capable of optically recording first data; an imprinted layer disposed between the base layer and the first recording layer; and a second recording layer. The second recording layer is disposed over the second surface of the base layer, contains a magnetic material, and has recorded second data different from the first data.

6 Claims, 3 Drawing Sheets

TAPE RECORDING MEDIUM HAVING BOTH OPTICAL AND MAGNETIC RECORDING LAYERS

RELATED APPLICATIONS

This application claims the benefit of Japanese Application No. 2014-042325, filed on Mar. 5, 2014 and Japanese Application No. 2014-241614, filed on Nov. 28, 2014, the disclosures of which Applications are incorporated by reference herein.

BACKGROUND

1. Field of the Invention

The present disclosure relates to a tape recording medium applied as a streaming tape for backup of data in a server or the like.

2. Description of the Related Art

In recent years, an amount of data that can be handled has explosively increased as computers and the Internet are developed more and more. Therefore, there is a demand for an increased capacity of recording media used for backup, and a tape recording medium having information recorded or reproduced by irradiation of laser light to an optical phase-change film that is disposed over the tape medium is gaining attention as one example of high-capacity recording media that respond to such a demand (Unexamined Japanese Patent Publication No. 2006-53980).

SUMMARY

A tape recording medium according to the present disclosure includes: a base layer having a first surface and a second surface; a first recording layer disposed over the first surface of the base layer and capable of optically recording first data; an imprinted layer disposed between the base layer and the first recording layer; and a second recording layer. The second recording layer is disposed over the second surface of the base layer, contains a magnetic material, and has recorded second data different from the first data.

DETAILED DESCRIPTION

Figure 1:
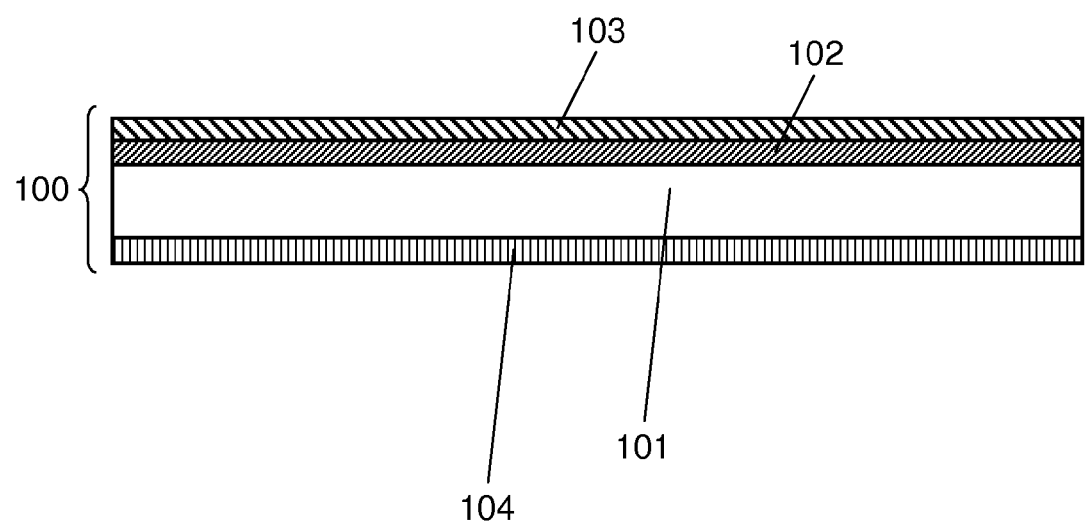
FIG. 1 is a cross-sectional view illustrating a tape recording medium according to one exemplary embodiment.

Hereinafter, exemplary embodiments will be described in detail with reference to the drawing as needed. However, an overly detailed description may be omitted. This, for example, includes detailed descriptions of well-known mattes and redundant descriptions of components that are substantially the same. The omission is made in order to prevent the following description from being too lengthy beyond necessity, and to facilitate understanding of the person skilled in the art.

The accompanied drawings and the following description are provided so that the person skilled in the art may fully understand the present disclosure, and are not intended to limit the subject matters defined in the scope of the claims.

First Exemplary Embodiment

Figure 2:
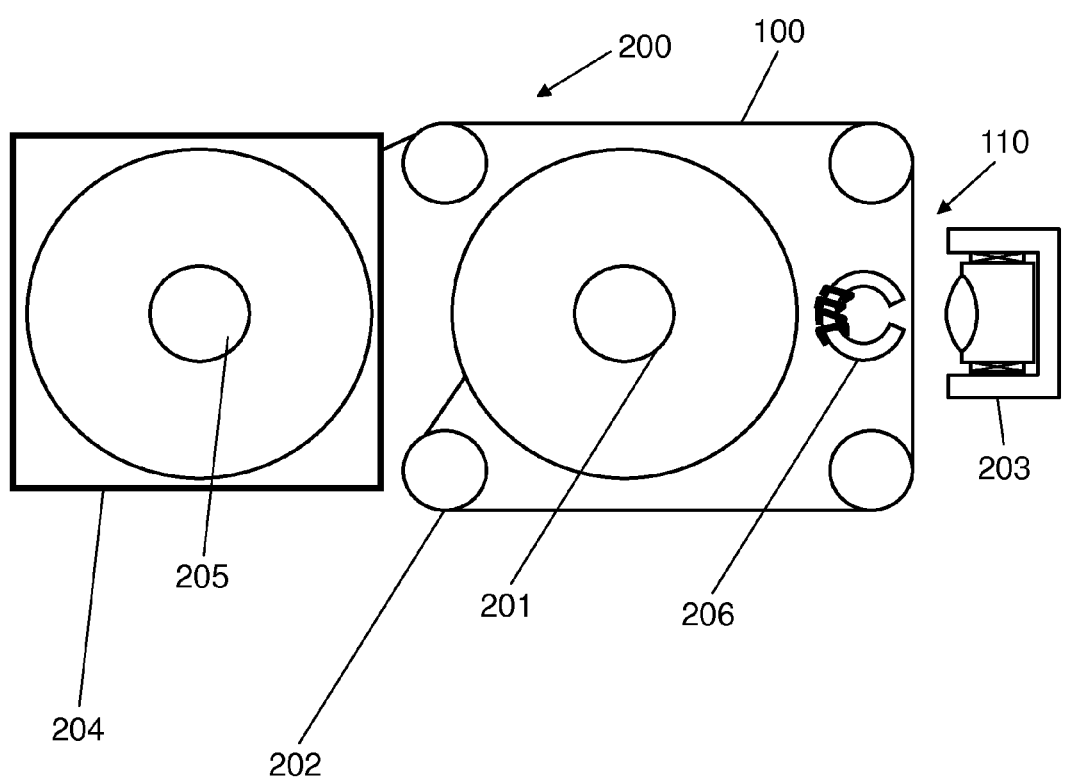
FIG. 2 is a configuration diagram illustrating an information recording/reproducing device according to one exemplary embodiment.

Hereinafter, one exemplary embodiment according to the present disclosure will be described with reference to FIG. 1 through FIG. 3.

1-1. Tape Recording Medium

Tape recording medium 100 (one example of tape recording media) includes base film 101 (one example of base layers), servo-imprinted layer 102 (one example of imprinted layers), first recording layer 103 (one example of first recording layers), and second recording layer 104 (one example of second recording layers).

Base film 101 is a polyethylene terephthalate film having thickness about 6 μm, for example.

Servo-imprinted layer 102 is a resin layer disposed over base film 101, and has a tracking pattern. In this exemplary embodiment, the tracking pattern is formed in the following manner. An acrylic-resin based ultraviolet curable resin is applied over base film 101, so that thickness of the applied resin becomes about 0.5 μm. The applied ultraviolet curable resin is pressed against a rotating roll-shaped embossing mold (embossing roll), and irradiated with ultraviolet light. As a result, an embossed pattern is transferred to the ultraviolet curable resin, and servo-imprinted layer 102 having a tracking pattern is disposed over base film 101.

The roll-shaped embossing mold is provided with a predetermined tracking pattern.

First recording layer 103 is formed by having an alloy film, a dielectric film, and a reflective film that is stacked over the tracking patterns using a sputtering method. The alloy film mainly includes Ge, Bi, and Te. The dielectric film mainly includes Si. The reflective film mainly includes Ag. In this exemplary embodiment, a thickness of first recording layer 103 is about 100 nm. First recording layer 103 is able to optically record data (one example of first data) from information recording/reproducing device 200 (FIG. 2) that will be later described, and the recorded data may be optically read by information recording/reproducing device 200 (FIG. 2).

Second recording layer 104 is formed by applying a back coat layer mainly includes Fe-based ferromagnetic alloy powder and carbon black over base film 101, so that the thickness of the back coat layer becomes about 0.5 μm. Second recording layer 104 is able to record position information relating to a position along a length of tape recording medium 100 (one example of second data) measured by information recording/reproducing device 200 (FIG. 2) that will be later described. The position information relating to the position along the longitudinal direction of the tape indicates a position along the track provided over first recording layer 103. Further, the recorded position information may be read by information recording/reproducing device 200. Tape recording medium 100 thus configured is able to record or read data, which is different from data recorded in or read from first recording layer 103, in or from second recording layer 104.

1-2. Information Recording/Reproducing Device 1-2-1. Configuration of Information Recording/Reproducing Device FIG. 2 is a diagram schematically illustrating a configuration of information recording/reproducing device 200 (one example of information recording/reproducing devices) according to this exemplary embodiment. Information recording/reproducing device 200 at least includes take-up reel 201, a plurality of guide rollers 202, optical pickup device 203 (one example of optical recording/reproducing units), magnetic head device 206 (one example of magnetic recording/reproducing units), and supply reel 205. Optical pickup device 203 is positioned so as to face tape recording medium 100 along tape traveling path 110. Magnetic head device 206 is positioned so as to face optical pickup device 203 with tape traveling path 110 interposed therebetween.

Tape recording medium 100 contained in cartridge 204 is set on supply reel 205 of information recording/reproducing device 200.

Take-up reel 201 is rotated by reel driving mechanism 207 (FIG. 3), and reels in tape recording medium 100 from cartridge 204. Supply reel 205 rotates along with the rotation of take-up reel 201, and reels out tape recording medium 100.

Guide rollers 202 are disposed at predetermined intervals between take-up reel 201 and supply reel 205, and constitute tape traveling path 110 for tape recording medium 100 so that tape recording medium 100 is caused to travel in a desired direction.

Optical pickup device 203 is configured by an optical pickup having a laser light source and a light receiver. Optical pickup device 203 makes traveling tape recording medium 100 be irradiated with laser light from the laser light source, and writes or reads a signal to and from first recording layer 103 (FIG. 1).

Magnetic head device 206 includes a magnetic head. Magnetic head device 206 records or reproduces a signal in or from second recording layer 104 of traveling tape recording medium 100.

Figure 3:
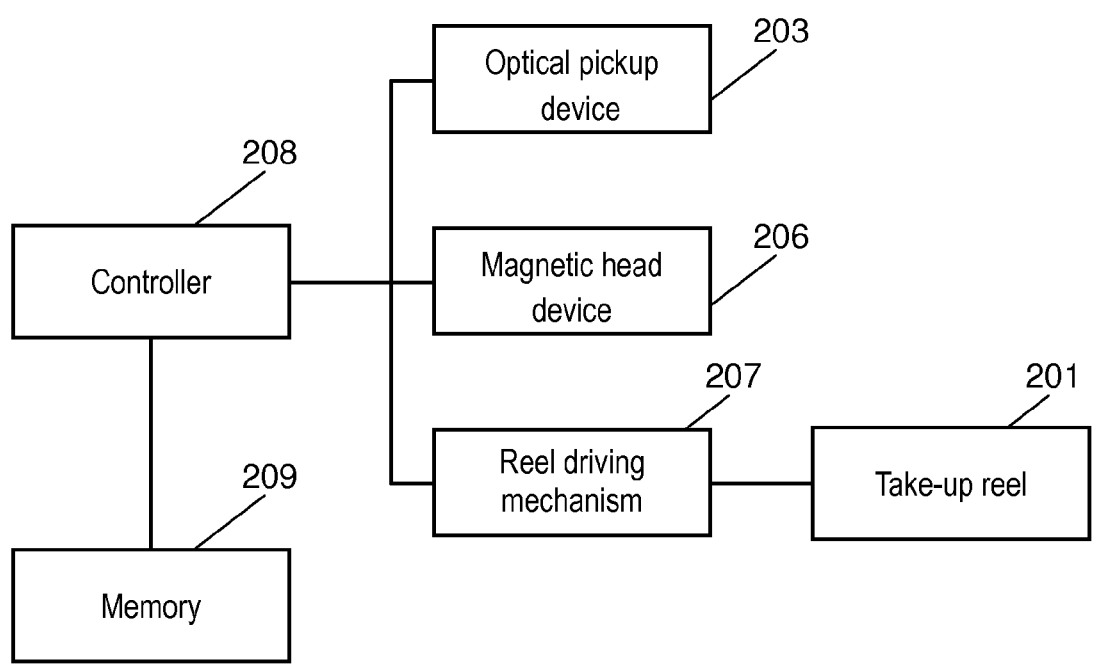
FIG. 3 is a functional diagram illustrating the information recording/reproducing device according to one exemplary embodiment.

As illustrated in FIG. 3, information recording/reproducing device 200 further includes controller 208 and memory 209. Controller 208 is configured by a processor or the like such as a CPU (central processing unit). Controller 208 controls reading and recording of a signal by optical pickup device 203 and magnetic head device 206. Controller 208 also drives reel driving mechanism 207 to control rotation of take-up reel 201. Memory 209 stores data such as data that has been read and data that is to be recorded.

1-2-2. Operation of Information Recording/Reproducing Device

Take-up reel 201 of information recording/reproducing device 200 reels out tape recording medium 100 from cartridge 204 using a loading mechanism (not depicted). At this time, tape recording medium 100 travels in front of optical pickup device 203 based on rotation control of supply reel 205 and take-up reel 201. Further, based on rotation control of take-up reel 201, tape recording medium 100 passes in front of optical pickup device 203 while being guided by the plurality of guide rollers 202, and then reeled up by take-up reel 201.

Magnetic head device 206 causes controller 208 to calculate signal information written to first recording layer 103 of tape recording medium 100 as the position information of magnetic head device 206. Magnetic head device 206 magnetically records the position information calculated by controller 208 in second recording layer 104. Magnetic head device 206 is also able to read the position information recorded in second recording layer 104.

In this exemplary embodiment, information recording/reproducing device 200 makes tape recording medium 100 travel at 4.9 m/s when a signal is recorded or reproduced in or from recording layer 103, and makes tape recording medium 100 travel at 20 m/s when a signal is fast-forwarded or fast-rewound. Further, in this exemplary embodiment, at the same time as fast-forwarding of tape recording medium 100 at 20 m/s, information recording/reproducing device 200 causes magnetic head device 206 to reproduce, at a reference frequency of 4 MHz, the position information relating to the position along the longitudinal direction of the tape recorded at a shortest recording frequency of about 5 μm in second recording layer 104 including a magnetic body. Information recording/reproducing device 200 is also able to control the traveling of tape recording medium 100 by reducing rotational speed of take-up reel 201 when optical pickup device 203 and magnetic head device 206 become closer to a predetermined position along the longitudinal direction of the tape. Accordingly, information recording/reproducing device 200 is also able to promptly cause optical pickup device 203 and magnetic head device 206 to reach the predetermined position along the length of tape recording medium 100.

1-3. Effects

Tape recording medium 100 (one example of tape recording media) according to this exemplary embodiment includes base film 101 having a first surface and a second surface (one example of base layers), first recording layer 103 disposed over the first surface of base film 101 and capable of optically recording first data (one example of first recording layers), servo-imprinted layer 102 disposed between base film 101 and first recording layer 103 (one example of imprinted layers), and second recording layer 104 (one example of second recording layer). Second recording layer 104 is disposed over the second surface of base film 101, contains a magnetic material, and records second data different from the first data.

Information recording/reproducing device 200 according to this exemplary embodiment (one example of information recording/reproducing devices) includes optical pickup device 203 that optically records or reproduces the first data (one example of optical recording/reproducing units), and magnetic head device 206 that magnetically records or reproduces the second data different from the first data in or from tape recording medium 100 (one example of magnetic recording/reproducing units).

Thus, separately from the optical recording of high-capacity signal in first recording layer 103 by optical pickup device 203, magnetic head device 206 is able to record the position information relating to the position along the longitudinal direction of the tape to second recording layer 104 containing the magnetic body. As a result, even when a tracking pattern is repeatedly formed by roll imprinting using a seamless stamper, it is possible to record the position information relating to the position along the length of tape recording medium 100 in a readable manner. Therefore, it is possible to easily obtain the position information relating to the position along the length of tape recording medium 100 when recording or reproducing of the information.

Other Exemplary Embodiment

As described above, one exemplary embodiment has been described as an example of the technique disclosed in the present disclosure. However, the technique disclosed in the present disclosure is not limited to the above exemplary embodiment, and may be applied to an exemplary embodiment with appropriate alteration, substitution, addition, omission, or the like.

In the exemplary embodiment described above, information recording/reproducing device 200 may record the second data in second recording layer 104 substantially at the same time when the first data is recorded in the first recording layer 103 of tape recording medium 100. Alternatively, information recording/reproducing device 200 may record the second data in second recording layer 104 after tape recording medium 100 is loaded and before the first data is recorded in first recording layer 103. Further alternatively, the second data may be recorded in second recording layer 104 when tape recording medium 100 is manufactured.

Moreover, according to the exemplary embodiment, controller 208 is not limited to the configuration as a single processor, and may be configured by a plurality of processors provided respectively within optical pickup device 203 and magnetic head device 206.

Further, an application of the present disclosure is not limited to the tape recording medium or the information recording/reproducing device. For example, the present disclosure may also be applied to a method of manufacturing a tape recording medium.

The present disclosure may be applied to a streaming tape for backup of data in a server or the like.

What is claimed is:

1. A tape recording medium comprising:
a base layer having a first surface and a second surface;
a first recording layer disposed over the first surface of the base layer and capable of optically recording first data;
an imprinted layer disposed between the base layer and the first recording layer; and
a second recording layer disposed over the second surface of the base layer, containing a magnetic material, and having recorded second data different from the first data, the second data being information relating to a position of the first data to be recorded in the first recording layer along a longitudinal direction of the tape recording medium.

2. The tape recording medium according to claim 1, wherein
the second data is information indicating a position along a track provided over the first recording layer.

3. The tape recording medium according to claim 1, wherein
the imprinted layer is provided repeatedly with a predetermined tracking pattern.

4. An information recording/reproducing device for recording or reproducing first data in or from a tape recording medium having a first recording layer, a second recording layer, and an imprinted layer, the imprinted layer being provided repeatedly with a predetermined tracking pattern, the device comprising:
an optical recording/reproducing unit configured to optically record or reproduce the first data in or from the first recording layer;
a magnetic recording/reproducing unit configured to magnetically record or reproduce second data in or from the second recording layer, the second data being different from the first data and being information relating to a position of the first data to be recorded in the first recording layer along a longitudinal direction of the tape recording medium;
a reel driving mechanism by which the tape recording medium is transported; and
a controller configured to calculate the second data from the position of the first data, and drive the reel driving mechanism using the predetermined tracking pattern and the second data as references.

5. A method of manufacturing a tape recording medium, the method comprising the steps of:
forming a base layer having a first surface and a second surface;
forming an imprinted layer over the first surface of the base layer;
forming a first recording layer disposed over the imprinted layer and capable of optically recording first data;
forming a second recording layer disposed over the second surface of the base layer, the second recording layer containing a magnetic material; and
recording second data different from the first data in the second recording layer, the second data being information relating to a position of the first data to be recorded in the first recording layer along a longitudinal direction of the tape recording medium.

6. The method of manufacturing a tape recording medium according to claim 5 further comprising the step of:
forming a predetermined tracking pattern repeatedly over the imprinted layer.

* * * * *